April 23, 1940.  G. J. RUMPLER  2,198,181
LINK MECHANISM FOR TURNBUCKLES
Filed Nov. 16, 1938
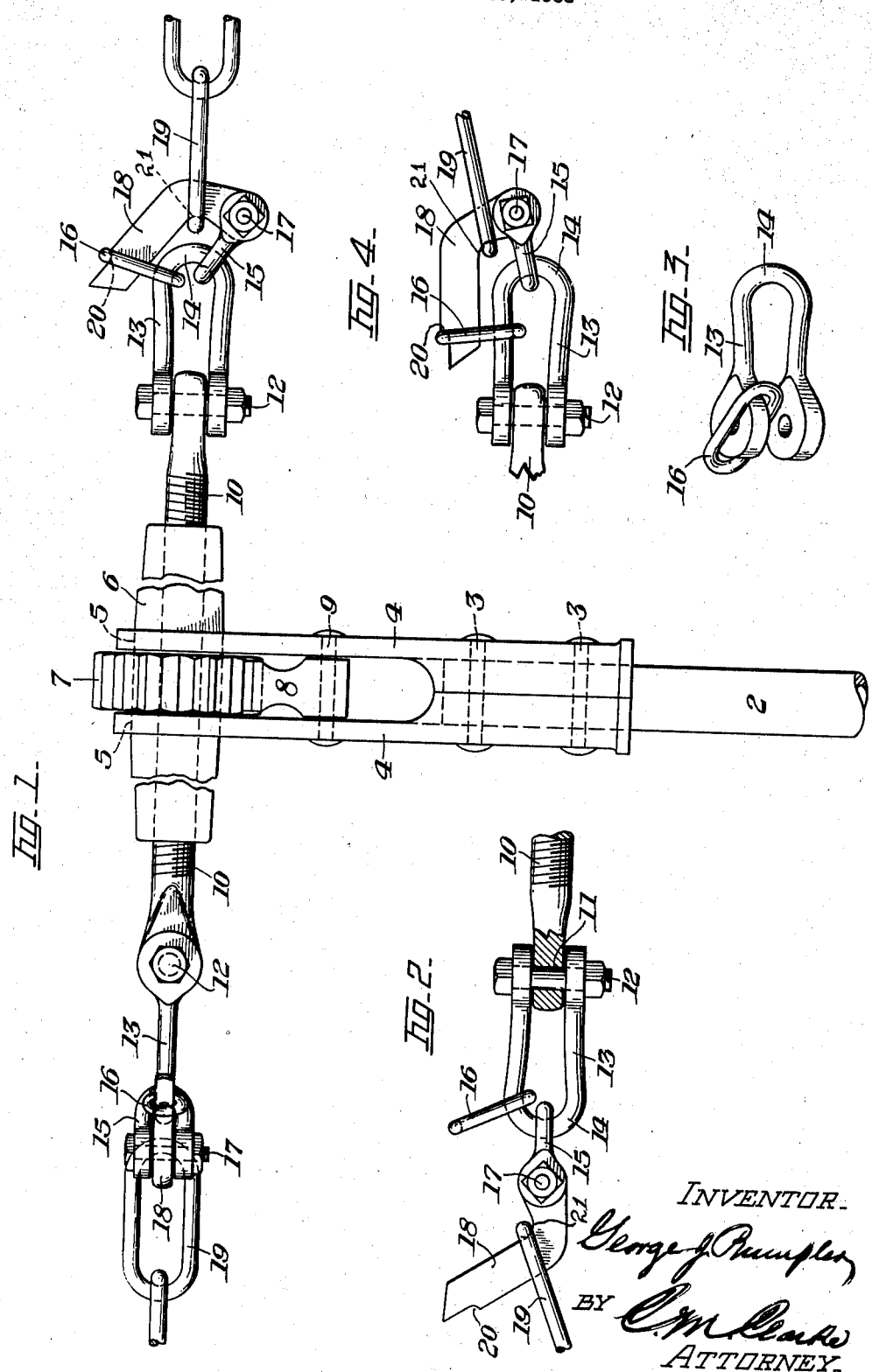

Patented Apr. 23, 1940

2,198,181

UNITED STATES PATENT OFFICE 2,198,181

LINK MECHANISM FOR TURNBUCKLES

George J. Rumpler, West View, Pa., assignor to W. W. Patterson, Jr., West View, Pa.

Application November 16, 1938, Serial No. 240,715

2 Claims. (Cl. 24—116)

This invention is an improvement in the lock and link mechanism of tension exerting tools of the kind generally known as steamboat ratchets. In such devices, reversely threaded bolts are actuated in opposite directions by means of a turnbuckle member mounted for rotation in a suitable lever having a reversible pawl engageable with the turnbuckle ratchet, and having chain or loop-engaging couples connected with each bolt.

Heretofore the terminal coupling members of similar tools have been of such construction as to involve considerable expense and delay in case of breakage, or else substitution of an entire bolt and its linkage and lock mechanism. Otherwise, such repairs were made by tedious re-welding or replacement forging, resulting inaccuracy in fittings, insecure coupling, added expense, etc., all tending to impair continued efficiency.

Such a prior construction is shown in patent of W. W. Patterson et al., No. 111,564.

Such objections and failures are overcome and compensated for in my improved construction, consisting in the connections between one or both of the bolt terminals and the chain or chains or other looped elements to be tightened. In my present construction each part is separable and may be independently, quickly and easily located or replaced, either singly or all together.

In the drawing showing the invention as used:

Fig. 1 is a plan view of the complete tool, assembled for use, and with the connecting parts under tension.

Fig. 2 is a detail view showing the lock opened;

Fig. 3 is a detail view of one of the open ended links for connection with the bolt terminal, showing application thereto of the closed lock-retaining link;

Fig. 4 is a detail view illustrating the locking arm in position for engagement by the link 16, prior to tension.

The operating handle or lever 2 of the tool is connected by rivets 3 or the like with the bifurcated arms 4, 4, journalled at 5, 5, around the turnbuckle 6.

A ratchet wheel 7 is secured midway of the turnbuckle in any suitable manner, with which engages one or the other terminal of a reversible pawl 8 pivoted at 9 between arms 4, for tightening or loosening the tension, as will be readily understood.

A pair of right and left hand threaded bolts 10, 10, engage the end portions of the turnbuckle in the usual manner, the outer ends of the bolts being flattened and provided with a transverse bolt hole 11. Secured thereto by a removable cross bolt or pin 12 is an open ended link 13, the sides of which are slightly separated and rounded towards the outer somewhat enlarged retaining end 14, for free movement and assemblage of the link members 15 and 16.

Link member 15 is similar to open ended link 13, but is considerably shorter for pivotal connection by cross bolt 17 with the fulcrum bearing of the opening and closing locking arm 18. For easy manipulation of the link 16 the arm 18, after having engaged one of the links 19 of the chain, looped cable, or the like to be finally tightened, is then thrown backwardly under increasing tension, with its substantially straight shank portion overlapping link 13 edgewise, as in Fig. 4, with ample intervening clearance space.

Locking arm 18 is generally L shaped for inner crook engagement by the chain link or loop 19 when under tension. The free end of arm 18 is provided with a concaved shouldered bearing 20 against which link 16 is easily placed, when arm 18 is thus receded under tightening tension of link 19. Thereafter the arm and its holding link become adjusted under strain to approximately the positions shown in Fig. 1, for tension pull on the chain.

When thus positioned the chain link 19 is located in substantial alinement with the bolt 10, it being understood that the opposite end of the turnbuckle mechanism is similarly connected with any resisting element, as the terminal of the same chain when looped, or with any other anchoring hold. The arm 18, with inner angular crook 21 for link 19, is so designed with relation to open link 13 and retaining link 16 as to facilitate easy connection and disconnection with link 13, and free movement of the several elements in assuming best operating relations under tension, as in Figs. 4 and 1, successively.

By means of the construction thus illustrated and described it will be seen that the several parts, open ended links 13 and 15, and closed link 16, are readily connected with or disconnected from the terminal of main bolt 10 and of locking arm 18.

Likewise that link 16 is easily removed if broken and replaced, as in Fig. 3, and that the several parts readily assume their working positions for use in the manner intended.

The construction as a whole is simple, economical in construction and dependable in manufacture and use. It completely provides a prompt and satisfactory remedy by immediate substitution of new parts in the event of breakage or rupture of ordinary forged or welded closed links, while the connecting arm is also readily replaced and securely held against displacement under all conditions of use.

It will be understood that the parts may be designed as to size and strength to adapt them to the work in view or changed or varied in detail construction by the skilled mechanic, within the scope of the following claims.

What I claim is:

1. In a turnbuckle, the combination with its threaded bolt having a terminal transverse cylindrical pivoting hole, of a main open ended link having pivoting holes, a transverse pivoting pin connecting the ends of the link with the end of the threaded bolt for pivotal movement of the link in a plane coincident with a plane passing through the axial center of the bolt, an L shaped locking arm having at one end a transverse pivoting hole, a secondary relatively shorter open ended link in looped engagement with the main link, a transverse pivoting pin connecting the ends of the secondary link with the end of the locking arm ensuring its pivotal movement in tensioning adjustment in a plane bisecting the secondary link into two symmetrical parts and coinciding with the plane of the main link edgewise thereof, and a closed link freely engaging the main link and adapted to engage the free end of the locking arm and hold it in closed position in edgewise relation to the main link.

2. In a turnbuckle, the combination with its threaded bolt having a terminal transverse cylindrical pivoting hole, of a main open ended link having pivoting holes, a transverse pivoting pin connecting the ends of the link with the end of the threaded bolt for pivotal movement of the link in a plane coincident with a plane passing through the axial center of the bolt, an L shaped locking arm having at one end a transverse pivoting hole, a secondary relatively shorter open ended link in looped engagement with the main link, a transverse pivoting pin connecting the ends of the secondary link with the end of the locking arm ensuring its pivotal movement in tensioning adjustment in a plane bisecting the secondary link into two symmetrical parts and coinciding with the plane of the main link edgewise thereof, and a closed link freely engaging the main link and adapted to engage the free end of the locking arm and hold it in closed position in edgewise relation to the main link whereby when under tension by the engaged loop member of a tightening element the locking arm may assume adjusting and final positions in continuous edgewise relation to the main link.

GEORGE J. RUMPLER.